United States Patent [19]

Olson

[11] Patent Number: 4,516,033
[45] Date of Patent: May 7, 1985

[54] APPARATUS FOR CONVERTING FLOW OF WATER INTO ELECTRICAL POWER

[76] Inventor: Marvin Olson, 4457 Open Meadow Ct., San Jose, Calif. 95129

[21] Appl. No.: 499,317

[22] Filed: May 31, 1983

[51] Int. Cl.³ .............................................. F03B 7/00
[52] U.S. Cl. ...................................... 290/54; 290/42; 290/43; 290/55
[58] Field of Search .................... 290/1 R, 42, 43, 44, 290/53, 54, 55; 60/495, 496, 497, 498, 499, 500, 501, 502, 503, 504, 505, 506, 507; 416/132 B, 178, 84, 85; 417/330, 333, 334; 198/702, 701, 703, 704, 608; 415/2-7

[56] References Cited

U.S. PATENT DOCUMENTS

| | | | |
|---|---|---|---|
| 363,244 | 5/1887 | Kates | 416/84 X |
| 559,798 | 5/1896 | Harding | . |
| 1,291,768 | 1/1919 | Cole | 198/702 |
| 1,413,930 | 4/1922 | Orr et al. | 198/702 |
| 1,764,539 | 6/1930 | Stinson | 198/702 |
| 2,322,415 | 6/1943 | Buckbee | 198/701 X |
| 2,848,189 | 8/1958 | Caloia | 253/11 |
| 3,262,411 | 7/1966 | Kaltenecker | 114/5 |
| 3,446,171 | 5/1969 | Panoff | 114/5 |
| 3,752,738 | 8/1973 | Naymark | 176/87 |
| 3,912,937 | 10/1975 | Lesser | 290/54 X |
| 3,995,170 | 11/1976 | Graybill | 290/44 X |
| 4,001,596 | 1/1977 | Kurtzbein | 290/53 |
| 4,023,041 | 5/1977 | Chappell | 290/42 X |
| 4,204,406 | 5/1980 | Hopfe | 60/398 |
| 4,270,056 | 5/1981 | Wright | 290/54 |
| 4,301,377 | 11/1981 | Rydz | 290/54 X |
| 4,359,868 | 11/1982 | Slonim | 60/501 |

OTHER PUBLICATIONS

Pictorial Handbook of Technical Devices by Grafstein and Schwarz, 1971, Chemical Publishing Co., Inc., pp. 452 and 453.

Primary Examiner—William M. Shoop
Assistant Examiner—Paul Shik Luen Ip
Attorney, Agent, or Firm—Jack M. Wiseman

[57] ABSTRACT

Apparatus for generating electrical power includes a floatable platform, which supports a plurality of water wheels. The shafts of the water wheels are interconnected in tandem for driving an electric generator. The speed of rotation of each of the water wheels is regulated by adjustably positioning the respective vanes thereof.

7 Claims, 4 Drawing Figures

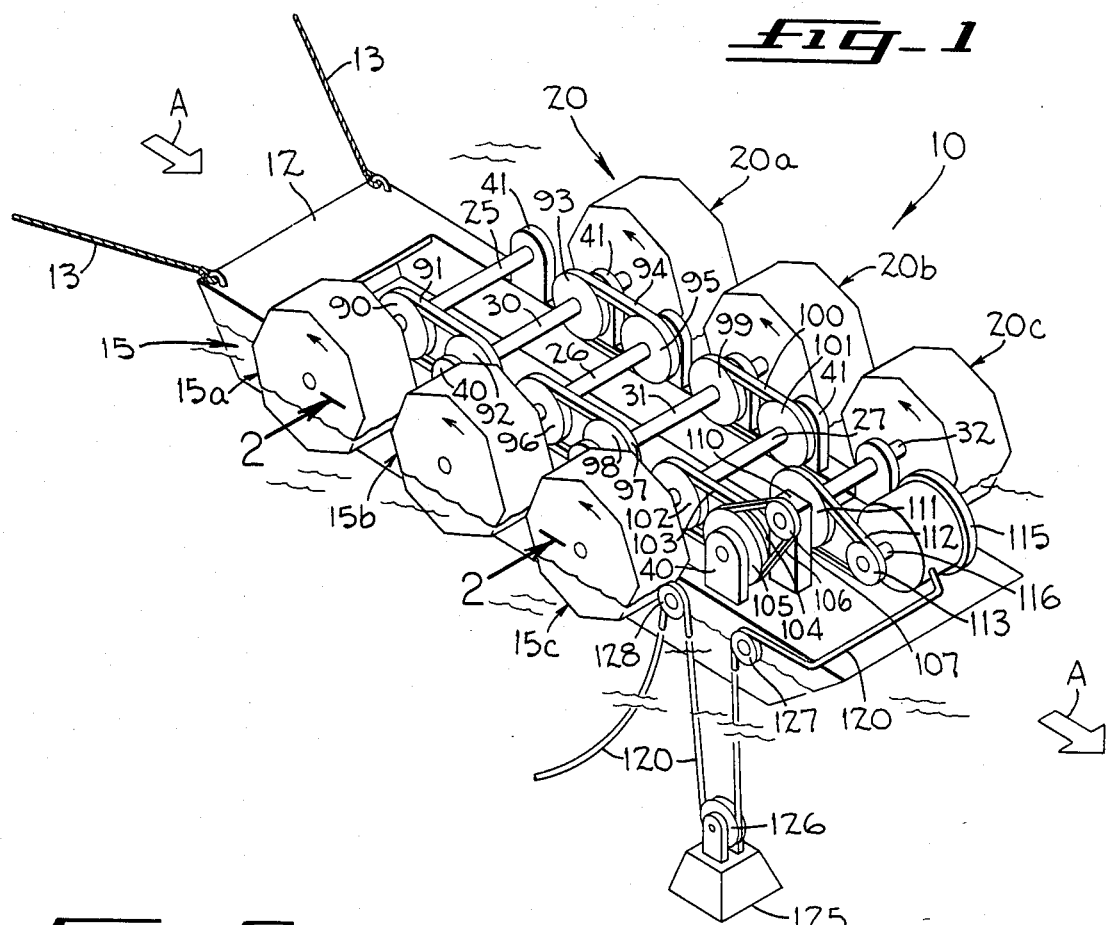
Fig_1
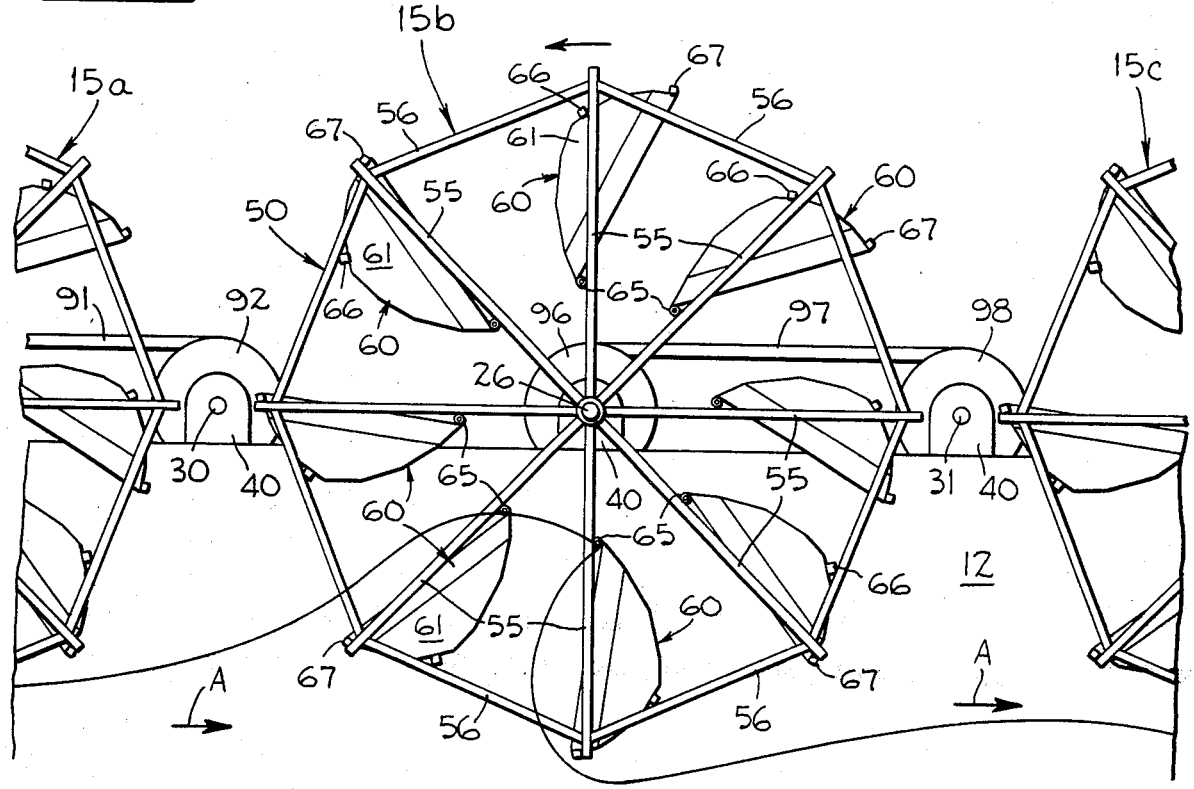
Fig_2

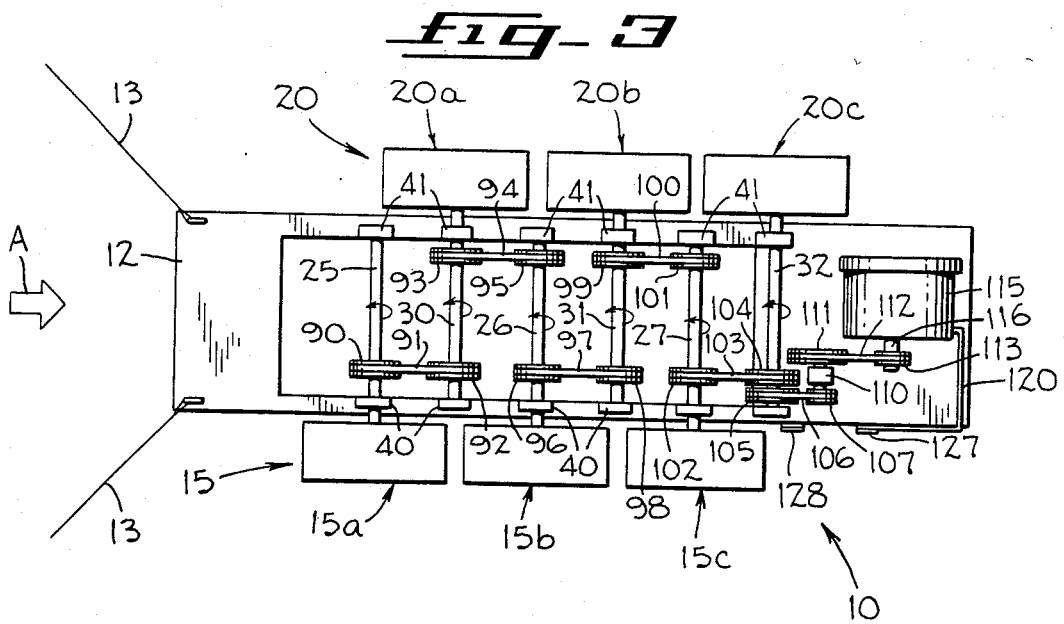
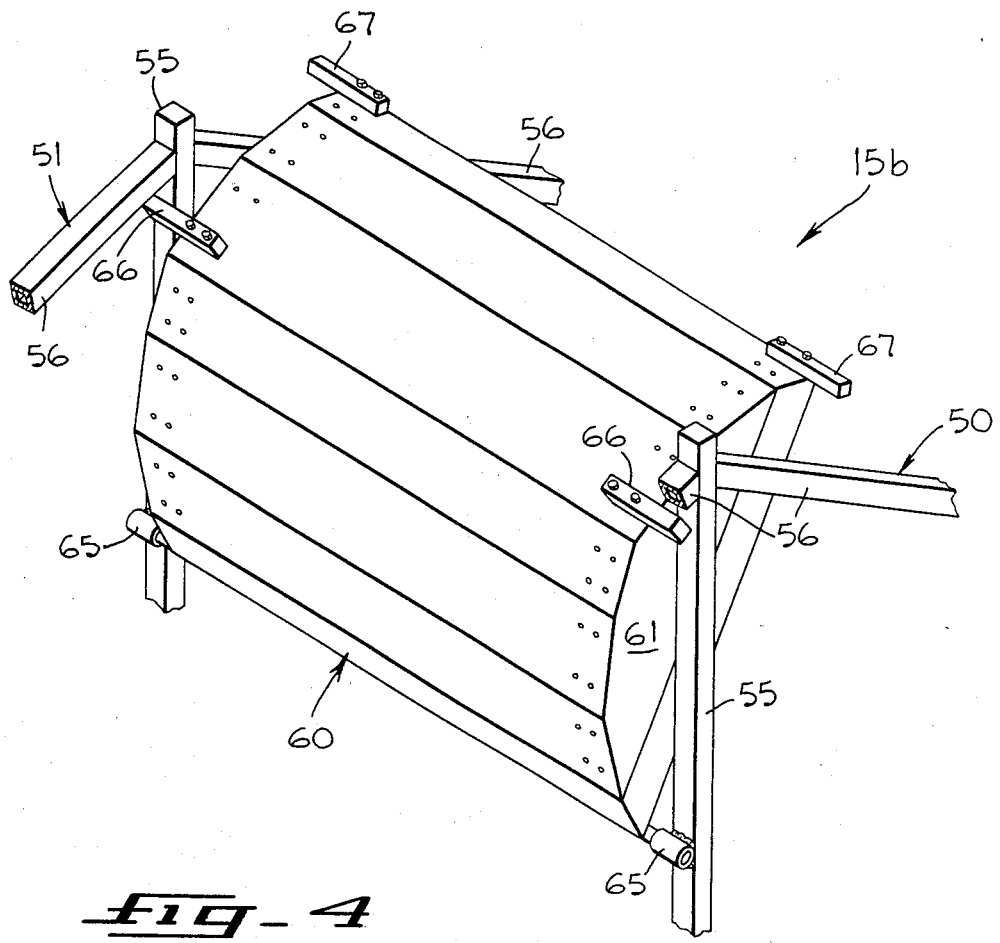

APPARATUS FOR CONVERTING FLOW OF WATER INTO ELECTRICAL POWER

BACKGROUND OF THE INVENTION

The present invention relates in general to apparatus for converting the flow of water into electrical power, and more particularly to apparatus for converting the flow of water into electrical power wherein such apparatus is carried by a floatable platform.

The water wheel has been used extensively for the generation of electric power. It has taken many forms including the current wheel in which water advances the lowermost vanes to rotate the wheel for the generation of power. Similarly, the undershot water wheel has the lower vanes advanced by the fall of water to rotate the wheel for the generation of power.

The use of barges and hulls for supporting power plants has been known. In the patent to Sherman Naymark, No. 3,752,738, there is disclosed a nuclear reactor plant floatable as a hull for transport from a place of construction to mooring at a site of ultimate use. In the patent to Panoff et al., No. 3,446,171, there is disclosed a marine nuclear plant having a containment vessel connected to the bottom of a ship. The patent to Kaltenecker, No. 3,262,411, discloses a process plant installed on a barge. The process plant can be erected on the barge in one location and then towed to another location where the barge becomes the foundation for the process plant.

In the patent to Harding, No. 559,798, there is disclosed a float. On the float is a mechanism that rises and falls with the movement of waves for generating power. The patent of Caloia, No. 2,848,189, discloses an apparatus for producing electric power from the action of water waves. The apparatus may be installed on a pier. The patent to Hopfe, No. 4,204,406, discloses apparatus for extracting hydrodynamic energy from ocean waves. The apparatus includes a floating platform.

SUMMARY OF THE PRESENT INVENTION

An object of the present invention is to provide apparatus for generating electrical power wherein the apparatus includes a floatable platform and hydrodynamic power generated is extracted from the waves or flow of water.

Another object of the present invention is to provide apparatus for generating electrical power wherein the apparatus includes a floatable platform and electrical power is generated by the accumulative hydrodynamic power derived from the movement of water wheels.

The apparatus of the present invention for generating electrical power includes a floatable platform which supports devices operable through the waves or movement of water. The apparatus includes an electric generator and a plurality of water wheels which rotate in response to the waves or movement of water. The hydrodynamic power output is derived from the water wheels, the speed of rotation of which is regulated by adjustably positioning the vanes thereof.

A feature of the present invention is the tandem arrangement for accumulating power from movement of water wheels to drive an electric generator.

DESCRIPTION OF THE DRAWINGS

FIG. 1 is a diagrammatic perspective view of apparatus embodying the present invention for converting the waves or movement of water into electrical power.

FIG. 2 is an enlarged diagrammatic fragmentary side elevational view of the apparatus shown in FIG. 1 taken along the line 2—2 of FIG. 1.

FIG. 3 is a diagrammatic plan view of the apparatus shown in FIG. 1.

FIG. 4 is a fragmentary diagrammatic perspective view of a water wheel shown in FIG. 2 to particularly illustrate the construction of a vane thereof.

DETAILED DESCRIPTION OF THE PREFERRED EMBODIMENT

Illustrated in FIGS. 1 and 3 is the apparatus 10 embodying the present invention for converting the waves or flow of water into electrical power. The apparatus 10 comprises a suitable floatable platform 12 for supporting the apparatus 10 in water. The floatable platform 12 may be in the form of a hull, barge or the like. The direction of water flow or wave motion for operating the apparatus 10 is shown by the arrows A in FIGS. 1 and 2.

The apparatus 10 can be towed in water to various locations suitable for converting the flow of water into electrical power. After reaching a desired location in water, the apparatus 10 is anchored for mooring in a well-known manner through suitable cables 13. The cables 13 can be secured to suitable anchors, piers or the like, not shown.

Carried by the floatable platform 12 along the respective sides thereof are two sets of water wheels 15 and 20. The set of water wheels 15 includes a suitable number of water wheels, by way of example, water wheels 15a–15c, which are disposed in longitudinally spaced relation. The set of water wheels 20 includes a suitable number of water wheels, by way of example, water wheels 20a–20c, which are disposed in longitudinally spaced relation. In the preferred embodiment, there are seven water wheels in the set 15 and seven water wheels in the set 20.

The water wheels 15a–15c are fixedly secured to axially disposed shafts 25–27, respectively, to impart rotation thereto. In a similar manner, the water wheels 20a–20c are fixedly secured to axially disposed shafts 30–32 to impart rotation thereto. The shafts 25–27 and 30–32 are journalled for rotation by suitable confronting upstanding supports or ears 40 and 41. The supports 40 are fixed to one side of the floatable platform 12 and the supports 41 are fixed to the other side of the floatable platform 12. The supports 40 are aligned transversely with respective supports 41. Each shaft 25–27 and 30–32 is journalled for rotation by a transversely aligned support 40 and support 41.

The water wheels 15a–15c and 20a–20c are similar in construction and in operation. For purposes of brevity, only the water wheel 15b will be described in detail.

The water wheel 15b (FIG. 2) comprises a pair of upright octagonal frames 50 and 51 spaced apart in the transverse direction. The frames 50 and 51 receive at the axes thereof the shaft 26 and are fixed to the shaft 26 to impart rotation thereto. The octagonal frames 50 and 51 are similar in construction. Each octagonal frame comprises radially disposed members or braces 55 fixed to the shaft 26. The distal ends of successive braces 55 are joined by peripheral members or braces 56. Successive braces 55 joined by a brace 56 define a triangular sector of the associated frame.

Disposed between the frames 50 and 51 are water wheel vanes 60. The vanes 60 are similar in construction and in operation. Each vane 60 comprises a suitably shaped body 61 for being subject to the force applied by the wave or flow of water. The opening of the hollow or scooped shaped body faces in the direction of the flow of water. In the exemplary embodiment, there are eight sectors to the frames 50 and 51. At the vertex of each set of axially spaced, parallel sectors of the frames 50 and 51 is disposed a vane 60. The vanes 60 extend radially inwardly from the associated vertices along the associated radial braces 55 and extend outwardly in the direction of rotation along the associated peripheral braces 56. The vanes 60 are attached to the frames 50 and 51 to impart rotation thereto. Thus, the lower vanes 60 (FIG. 2) are partially immersed in water and are exposed to the flow of water of the force applied by the waves in the direction of the arrows A to be impelled for rotation in the counterclockwise direction as viewed in FIGS. 1 and 2 causing the frames 50 and 51 to rotate in the same direction. The rotation of the frames 50 and 51 impart rotation to the shaft 26.

Each vane 60 is attached to its associated braces 55 by suitable journals or bearings 65. Mounted on each vane 60 are stops 66 and 67. The stops 66 are adjustably secured to the vane 60 by nuts and bolts, and engage their associated radial braces 55 to limit the movement of the vane 60 under impact from the wave or flow of water. In a similar manner, the stops 67 are adjustably secured to the vane 60 by nuts and bolts, and engage their associated peripheral braces 56 to limit the movement of the vane 60 under impact from the wave or flow of water. The nuts and bolts securing the stops 66 and 67 to the vanes 60 are selectively inserted in openings spaced along the arcuate direction of the vane. The vanes 60 are adjustably positioned by the stops 66 and 67, when subjected to waves or movement of water, to regulate the hydrodynamic force applied to the vanes 60. In so doing, the cup exposure of each vane 60 to the wave or movement of water is adjusted. By regulating the applied hydrodynamic force applied to a vane or adjusting the cup exposure of the vane, the speed of rotation of the associated water wheel is regulated. The regulation of the speed of rotation of the water wheels regulates the revolutions per minute of an electric generator, thereby regulating the cyclic output of the generated current and voltage. More specifically, the vanes are adjusted to the size of the applied waves. The larger the wave, the smaller the effective size of the cup. Conversely, the smaller the wave, the larger the effective size of the cup.

Fixed to the shaft 25 is a pulley or sheave 90. Rotation of the water wheel 15a rotates the shaft 25, which, in turn, rotates the pulley 90. Trained around the pulley 90 is an endless belt 91, which is also trained around a pulley 92. The pulley 92 is fixed to the shaft 30. Also fixed to the shaft 30 is a pulley 93. The rotation of the water wheel 20a imparts rotation to the shaft 30 and the rotation of the endless belt 91 imparts rotation to the shaft 30. Thus, there is dual application of hydrodynamic power applied to the shaft 30, which is transferred or transmitted through the pulley 93.

Trained around the pulley 93 is an endless belt 94, which is also trained around a pulley or sheave 95. The pulley 95 is fixed to the shaft 26 to impart rotation thereto. Also fixed to the shaft 26 is a pulley or sheave 96. Rotation of the water wheel 15b imparts rotation to the shaft 26. Therefore, hydrodynamic power is applied to the shaft 26 through the pulley 95 and the water wheel 15b. Trained around the pulley 96 is an endles belt 97. Thus, accumulated hydrodynamic power from the water wheels 15a, 20a and 15b is transferred or transmitted through the pulley 96.

Fixedly secured to the shaft 31 for imparting rotation thereto is a pulley or sheave 98. Trained around the sheave 98 is the endless belt 97. The endless belt 97 imparts rotation to the sheave 98 to transfer hydrodynamic power to the shaft 31. The water wheel 20b is also fixed to the shaft 31 to transfer hydrodynamic power to the shaft 31. Fixed to the shaft 31 to transfer or transmit hydrodynamic power therefrom is a pulley or sheave 99. Thus, hydrodynamic power from the water wheels 15a, 20a, 15b and 20b is transmitted or transferred from the pulley 99.

Trained around the pulley 99 is an endless belt 100. The endless belt 100 is trained around a pulley or sheave 101 to transfer hydrodynamic power thereto. In turn, the pulley 101 is fixed to the shaft 27 to transfer hydrodynamic power thereto. The water wheel 15c is fixed to the shaft 27 to transfer hydrodynamic power thereto. Fixed to the shaft 27 for transferring hydrodynamic power from the shaft 27 is a pulley or sheave 102. Trained around the pulley 102 to be driven thereby is an endless belt 103. Hence, hydrodynamic power from the water wheels 15a, 20a, 15b, 20b, 15c is transferred through the endless belt 103.

The endless belt 103 is also trained around a pulley or sheave 104, which is fixed to the shaft 32. The water wheel 20c is fixed to the shaft 32 to transfer hydrodynamic power thereto. In addition thereto, a sheave or pulley 105 is fixed to the shaft 32 to be rotated thereby. Hence, hydrodynamic power from the water wheels 15a–15c and 20a–20c is transferred or transmitted through the sheave 105.

Trained around the sheave 105 is an endless belt 106. The endless belt 106 is trained around a pulley or sheave 107 at the input side of a power drive apparatus 110. At the output side of the power drive apparatus 110 is a sheave or a pulley 111. Trained around the pulley 111 is an endless belt 112, which is also trained around a sheave or pulley 113 of an electric generator 115. Rotation of the pulley 113 imparts rotation to a shaft 116 of the electric generator 115.

Connected to the output side of the electric generator 115 is a cable 120 for the transmission of electric power to a remote location. The apparatus 10 is anchored to a fixed location, in the manner heretofore described, while operating as a source of electric power generation. Intermediate the ends of the output power cable 120 in the vicinity of the floatable platform 12 is a suitable weight 125 (FIG. 1). At the top of the weight 125 is a pulley 126. On the floatable platform 12 in longitudinally spaced relation are pulleys 127 and 128. The pulleys 126–128 are journalled for rotation. The output power cable 120 is trained around the pulley 127, then around the pulley 126 and then around the pulley 128 with the free end thereof extending from the pulley 128 to a remote location for the transfer of electric power. The weight 125 maintains tension in the electric power cable 120 in spite of movement of the floatable platform 12 with respect to its mooring through the mooring cable 13.

In the preferred embodiment, the endless belts are in the form of stainless steel chains and the pulleys or sheaves are in the form of suitable gears. The transmission of hydrodynamic power or the retransmission of hydrodynamic power is a serial or tandem arrangement. Thus, there is an accumulative effect of power input for rotating the input shaft of the electric generator 115. The speed of rotation of the input shaft of the electric generator 115 is maintained relatively constant by adjustment of the positions of the vanes 60. The increased power applied to the input shaft of the electric generator 115 enables a greater electric power output by being able to employ an electric generator rated for the higher power output. In making adjustment to the effective cup size of the vanes by adjusting the positions thereof through the stops 66 and 67, the vanes 60 are adjusted to conform with the energy peaks of the applied waves, as shown in FIG. 2.

I claim:

1. Apparatus for converting the flow of water into electric power comprising:
   (a) a floatable platform formed with opposite sides;
   (b) a plurality of water wheels mounted on each side of said platform for rotation and adapted to be impelled by the flow of water for rotation;
   (c) coupling means interconnecting said water wheels for transmitting hydrodynamic power, said coupling means comprising an axial shaft for each of said water wheels respectively, said axial shafts being rotatable in response to its associated water wheel being impelled to rotate by the flow of water, successive water wheels of said water wheels being located on said opposite sides of said platform, said coupling means interconnecting successive axial shafts of said axial shafts for transferring hydrodynamic power successively from axial shaft to axial shaft for progressively increasing the magnitude of transferred hydrodynamic power; and
   (d) electric generating means responsive to the transmission of said hydrodynamic power for generating electric power.

2. Apparatus as claimed in claim 1 wherein each of said water wheels comprise a plurality of vanes disposed peripherally along its associated water wheel.

3. Apparatus as claimed in claim 2 wherein means on each of said vanes are adjustable for controlling the speed of rotation of its associated water wheel.

4. Apparatus as claimed in claim 2 wherein means on each of said vanes are adjustable to vary the position of its associated vane relative to the associated water wheel.

5. Apparatus as claimed in claim 1 and comprising means attached to said floatable platform for anchoring said floatable platform.

6. Apparatus as claimed in claim 1 and comprising an output power cable connected to said electric generating means.

7. Apparatus as claimed in claim 6 and comprising a weight with a pulley around which said output power cable is trained, and guide pulleys on said floatable platform around which said output power cable is trained, said pulley for said weight being disposed between said guide pulleys, whereby said output power cable is trained around one guide pulley, then said pulley for said weight and then the other of said output power cable, the free end of said output power cable being adapted for connection to a remote location.

* * * * *